United States Patent
Grove et al.

(10) Patent No.: US 9,762,670 B1
(45) Date of Patent: *Sep. 12, 2017

(54) MANIPULATING OBJECTS IN HOSTED STORAGE

(71) Applicant: Google Inc., Mountain View, CA (US)

(72) Inventors: Daniel D. Grove, Mercer Island, WA (US); Brian N. Bershad, Seattle, WA (US); David Erb, Seattle, WA (US)

(73) Assignee: Google Inc., Mountain View, CA (US)

( * ) Notice: Subject to any disclaimer, the term of this patent is extended or adjusted under 35 U.S.C. 154(b) by 272 days.

This patent is subject to a terminal disclaimer.

(21) Appl. No.: 14/543,737

(22) Filed: Nov. 17, 2014

Related U.S. Application Data

(63) Continuation of application No. 12/696,522, filed on Jan. 29, 2010, now Pat. No. 8,892,677.

(51) Int. Cl.
G06F 15/167 (2006.01)
H04L 29/08 (2006.01)
G06F 17/30 (2006.01)

(52) U.S. Cl.
CPC .... *H04L 67/1097* (2013.01); *G06F 17/30289* (2013.01); *H04L 67/18* (2013.01)

(58) Field of Classification Search
None
See application file for complete search history.

(56) References Cited

U.S. PATENT DOCUMENTS

| | | | |
|---|---|---|---|
| 6,529,948 B1 | 3/2003 | Bowman-Amuah | |
| 7,165,239 B2 | 1/2007 | Hejlsberg et al. | |
| 7,453,875 B2 | 11/2008 | Vernal et al. | |
| 7,715,371 B2 | 5/2010 | Low et al. | |
| 7,716,180 B2 | 5/2010 | Vermeulen et al. | |
| 7,752,214 B2 | 7/2010 | Pizzorni et al. | |
| 7,822,971 B2 | 10/2010 | Little et al. | |
| 7,979,450 B2 | 7/2011 | Adler | |
| 8,438,342 B1* | 5/2013 | Todd | G06F 3/0605 711/108 |
| 2005/0135264 A1 | 6/2005 | Popoff et al. | |
| 2006/0200753 A1 | 9/2006 | Bhatia et al. | |
| 2006/0265508 A1 | 11/2006 | Angel et al. | |
| 2008/0034196 A1* | 2/2008 | Tanaka | G06F 3/0605 713/1 |
| 2009/0106411 A1 | 4/2009 | Lisiecki et al. | |
| 2009/0198703 A1* | 8/2009 | Ezzat | G06F 17/30448 |
| 2009/0254610 A1 | 10/2009 | Arthursson | |
| 2010/0011091 A1 | 1/2010 | Carver et al. | |
| 2010/0042585 A1 | 2/2010 | Adler | |

(Continued)

OTHER PUBLICATIONS

Berners-Lee et al., "Uniform Resource Identifier (URI): Generic Syntax," RFC 3986, Jan. 2005, pp. 1-62.

(Continued)

*Primary Examiner* — Mohamed Ibrahim

(74) *Attorney, Agent, or Firm* — Fish & Richardson P.C.

(57) ABSTRACT

In aspect an application may be configured to issue a request to store an object, with the request including an object reference. A delegate may be configured to receive the request to store the object, determine a hosted storage service, from among multiple hosted storage services, and a corresponding access protocol based on the object reference, and store the object in the hosted storage service using the corresponding protocol.

20 Claims, 9 Drawing Sheets

(56) References Cited

U.S. PATENT DOCUMENTS

2010/0070516 A1     3/2010   Adler
2010/0274772 A1    10/2010   Samuels
2010/0333116 A1    12/2010   Prahlad et al.
2011/0185292 A1     7/2011   Charwla et al.

OTHER PUBLICATIONS

"Advantages of the Simple Object Access Protocol (SOAP) comparing with RPC Protocol" by Kiatisevi. Published Jun. 15, 2001. Retrieved on Jul. 26, 2011 from the Internet at URL: <http://linux.thai.net/~ott/docs/soap.pdf>.

"A Comparison of three Distributed File System Architectures: Vnode, Sprite, and Plan 9" by Welch. Published in Computing Systems, vol. 7, issue 2, spring 1994. Retrieved on Jul. 26, 2011 from the Internet at URL: <http://citeseerx.ist.psu.edu/viewdoc/download?doi=10.1.1.46.2817&rep=repl&type=pdf>. Citation including publication date available at URL: <http://portal.acm.org/citation.cfm?id=198005>.

"Information Access in Mobile Computing Environments" by Kulkarni et al. Published Oct. 1993. Retrieved on Jul. 26, 2011 from the Internet at URL: <http://citeseerx.ist.psu.edu/viewdoc/download?doi=10.1.1.37.5651&rep=repl&type=pdf>.

"A Distributed Multimedia Repository: Access Protocol Design and Implementation" by Centurino. Published Aug. 10, 1995. Retrieved on Jul. 26, 2011 from the Internet at URL: <http://citeseerx.ist.psu.edu/viewdoc/download?doi=10.1.1.37.5651&rep=repl&type=pdf>.

"The Lustre Storage Architecture" by Braam et al. Published Aug. 31, 2004. Retrieved on Jul. 26, 2011 from the Internet at URL: <ftp://ftp.uni-duisburg.de/Linux/filesys/Lustre/lustre.pdf>.

Office Action for U.S. Appl. No. 13/111,038 dated Nov. 14, 2011. 20 pages.

Office Action for U.S. Appl. No. 13/245,558 dated Nov. 18, 2011. 15 pages.

\* cited by examiner

MANIPULATING OBJECTS IN HOSTED STORAGE

CROSS-REFERENCE TO RELATED APPLICATIONS

This application is a continuation application of and claims priority to U.S. application Ser. No. 12/696,522, filed on Jan. 29, 2010, the entire contents of which are hereby incorporated by reference.

TECHNICAL FIELD

This document relates to hosted storage.

BACKGROUND

Hosted, or cloud-based storage, refers to off-site or remote data storage that is typically provided by a third party. The third party may implement the hosted storage in a data center, and provide access to the hosted storage over a network, such as the Internet.

SUMMARY

In one aspect, a request to store an object is received from an application implemented by one or more processing devices. The request includes an object reference. A hosted storage service may be determined, from among multiple hosted storage services, as well as a corresponding access protocol, based on the object reference. The object is stored in the hosted storage service using the corresponding protocol.

Implementations may include one or more of the following features. Storing the object in the hosted storage service using the corresponding access protocol may include generating an object identifier for the object, with the object identifier conforming to an object namespace of the hosted storage service, and storing the object in the determined hosted storage service using the object identifier and the corresponding access protocol. The object reference may include a storage group name such that determining the hosted storage service and the corresponding access protocol based on the object reference includes determining a hosted storage service and corresponding access protocol associated with the storage group name. The object reference may include an object name, and the object identifier may be associated with the object name.

A request to retrieve the object may be received from the application. The request to retrieve the object may include the object reference. The hosted storage service may be determined, from among multiple hosted storage services, as well as the corresponding access protocol, based on the object reference. The object may be retrieved from the hosted storage service using the corresponding access protocol, and provided to the application. Retrieving the object from the hosted storage service using the corresponding access protocol may include determining an object identifier based on the object reference, with the object identifier conforming to an object namespace of the hosted storage service, and retrieving the object from the hosted storage service using the corresponding access protocol and determined object identifier.

The object reference may include a storage group name and an object name such that: determining the hosted storage service and corresponding access protocol based on the object reference includes determining the hosted storage service and corresponding access protocol associated with the storage group name and determining the object identifier based on the object reference includes determining the object identifier based on the object name. A request to associate the hosted storage service with the storage group name may be received and the hosted storage service may be associated with the storage group name such that determining the hosted storage service based on the association between the object reference and the hosted storage service includes determining the hosted storage service based on the association between the hosted storage service and the storage group name.

A request to select a hosted storage service from among multiple hosted storage services may be received, with the request including one or more storage parameters. The hosted storage service may be selected based on the storage parameters and, in response to selecting the hosted storage service, an identifier of the hosted storage service may be provided to the application. The request to associate the hosted storage service with the storage group name may include the identifier of the hosted storage service such that receiving the request to associate the hosted storage service with the storage group name comprises receiving the identifier of the hosted storage service. The storage parameters may include one or more of a size of the object, a minimum level of security, whether queries should be supported, a minimum latency, a maximum cost metric, or a minimum privacy protection. Selecting the hosted storage service based on the storage parameters may include selecting the hosted storage service and one or multiple datastores in the hosted storage service based on the storage parameters.

The request to store the object may be received at a delegate and the delegate may be implemented by the client device or the delegate may be implemented as a web service by one or more server devices.

In another aspect, a system includes one or more processing devices; and a storage medium storing instructions that, when executed by the one or more processing devices, cause the one or more processing devices to implement an application and a delegate. The application is configured to issue a request to store an object, with the request including an object reference. The delegate is configured to receive the request to store the object, determine a hosted storage service, from among multiple hosted storage services, and a corresponding access protocol based on the object reference, and store the object in the hosted storage service using the corresponding protocol.

Implementations may include one or more of the following features. To store the object in the hosted storage service using the corresponding access protocol, the delegate may be configured to generate an object identifier for the object, with the object identifier conforming to an object namespace of the hosted storage service, and store the object in the determined hosted storage service using the object identifier and the corresponding access protocol. The object reference may include a storage group name such that, to determine the hosted storage service and the corresponding access protocol based on the object reference, the delegate is configured to determine the hosted storage service and corresponding access protocol based on the storage group name. The object reference may include an object name and the delegate may be configured to associate the object identifier with the object name.

The application may be configured to issue a request to retrieve the object, with the request to retrieve the object including the reference name, and the delegate may be configured to receive the request to retrieve the object, determine the hosted storage service, from among multiple hosted storage services, and the corresponding access protocol based on the object reference, retrieve the object from the hosted storage service using the corresponding access protocol, and provide the retrieved object to the application. To retrieve the object from the hosted storage service using the corresponding access protocol, the delegate may be configured to determine an object identifier based on the object reference, with the object identifier conforming to an object namespace of the hosted storage service, and retrieve the object from the hosted storage service using the corresponding access protocol and determined object identifier.

The object reference may include a storage group name and an object name such that, to determine the hosted storage service and corresponding access protocol based on the object reference, the delegate is configured to determine the hosted storage service and corresponding access protocol based on the storage group name and, to determine the object identifier based on the object reference, the delegate is configured to determine the object identifier based on the object name. The delegate may be configured to receive a request to associate the hosted storage service with the storage group name, and associate the hosted storage service with the storage group name such that, to determine the hosted storage service based on the association between the object reference and the hosted storage service, the delegate is configured to determine the hosted storage service based on the association between the hosted storage service and the storage group name. The delegate may be configured to receive a request to select a hosted storage service from among multiple hosted storage services, the request including one or more storage parameters, select the hosted storage service based on the storage parameters and, in response to selecting the hosted storage service, provide an identifier of the hosted storage service to the application.

In another aspect, a request to associate a hosted storage service with a storage group name may be received from an application implemented by one or more processing devices. In response to receiving the request to associate the hosted storage service with the storage group name, the hosted storage service is associated with the storage group name. A request to store an object is received from the application. The request includes the storage group name and an object name. In response to receiving the request to store the object, the hosted storage service is determined, from among multiple hosted storage services, as well as a corresponding access protocol, based on the association between the storage group name and the hosted storage service, an object identifier for the object is generated and associated with the object name, and the object is stored in the hosted storage service using the object identifier and the corresponding access protocol. The object identifier conforms to an object namespace of the hosted storage service. A request to retrieve the object is received from the application. The request includes the storage group name and the object name. In response to receiving the request to retrieve the object, the hosted storage service is determined, from among multiple hosted storage services, as well as the corresponding access protocol, based on the association between the storage group name and the hosted storage service, the object identifier is determined based on the association between the object name and the object identifier, and the object is retrieved from the hosted storage service using the object identifier and the corresponding access protocol. The retrieved object is provided to the application.

The details of one or more implementations are set forth in the accompanying drawings and the description below.

Other features and advantages will be apparent from the description and drawings, and from the claims.

DETAILED DESCRIPTION

Figure 1:
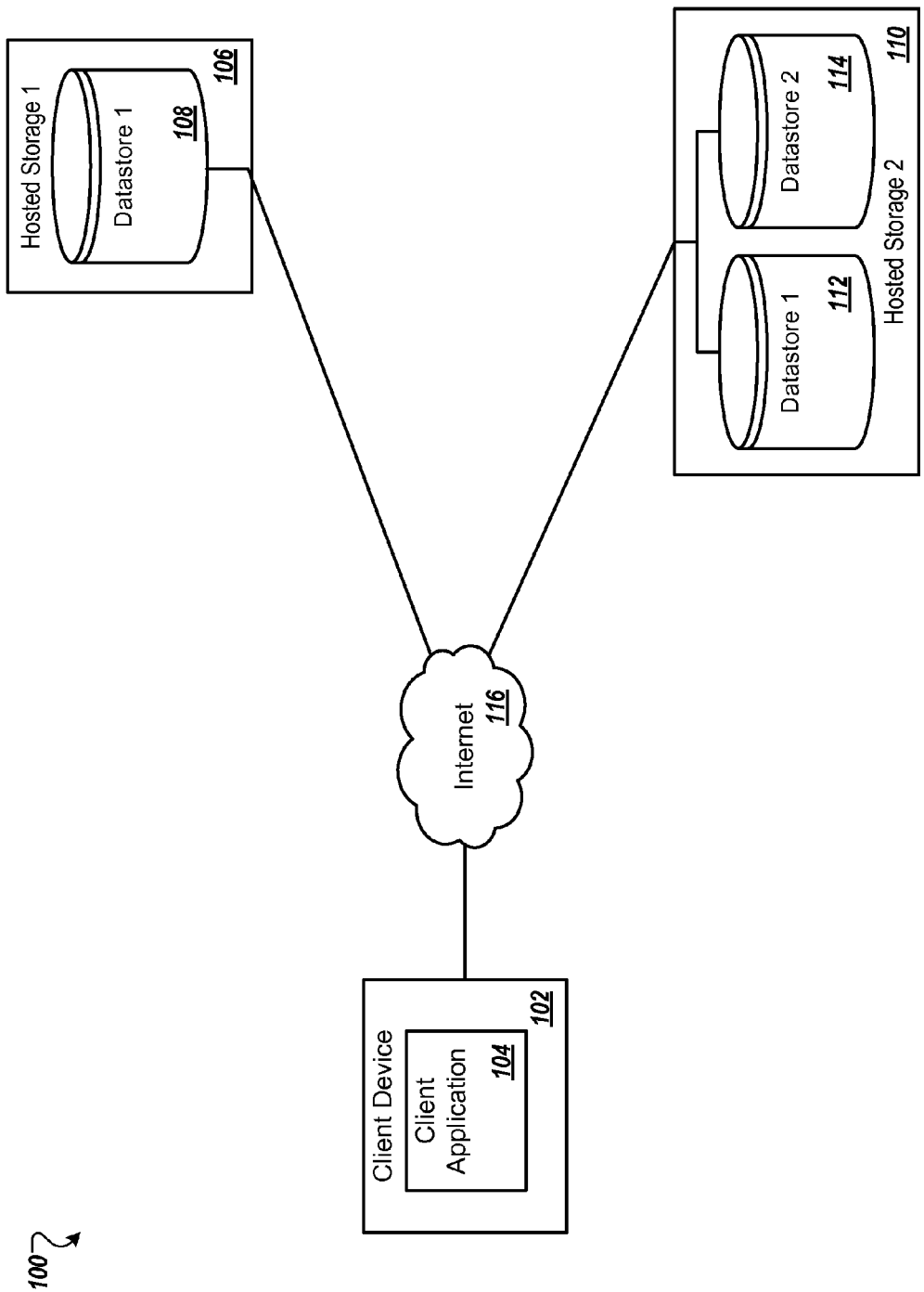
FIG. 1 is a block diagram showing an example of a system for providing hosted storage and accessing the hosted storage from a client device.

FIG. 1 is a block diagram showing an example of a system 100 for providing hosted storage and accessing the hosted storage from a client device. In the system 100, a client application can store and access data in hosted storage. The system 100 includes a client device 102, a network 116, a first hosted storage service 106, and a second hosted storage service 110.

Figure 6:
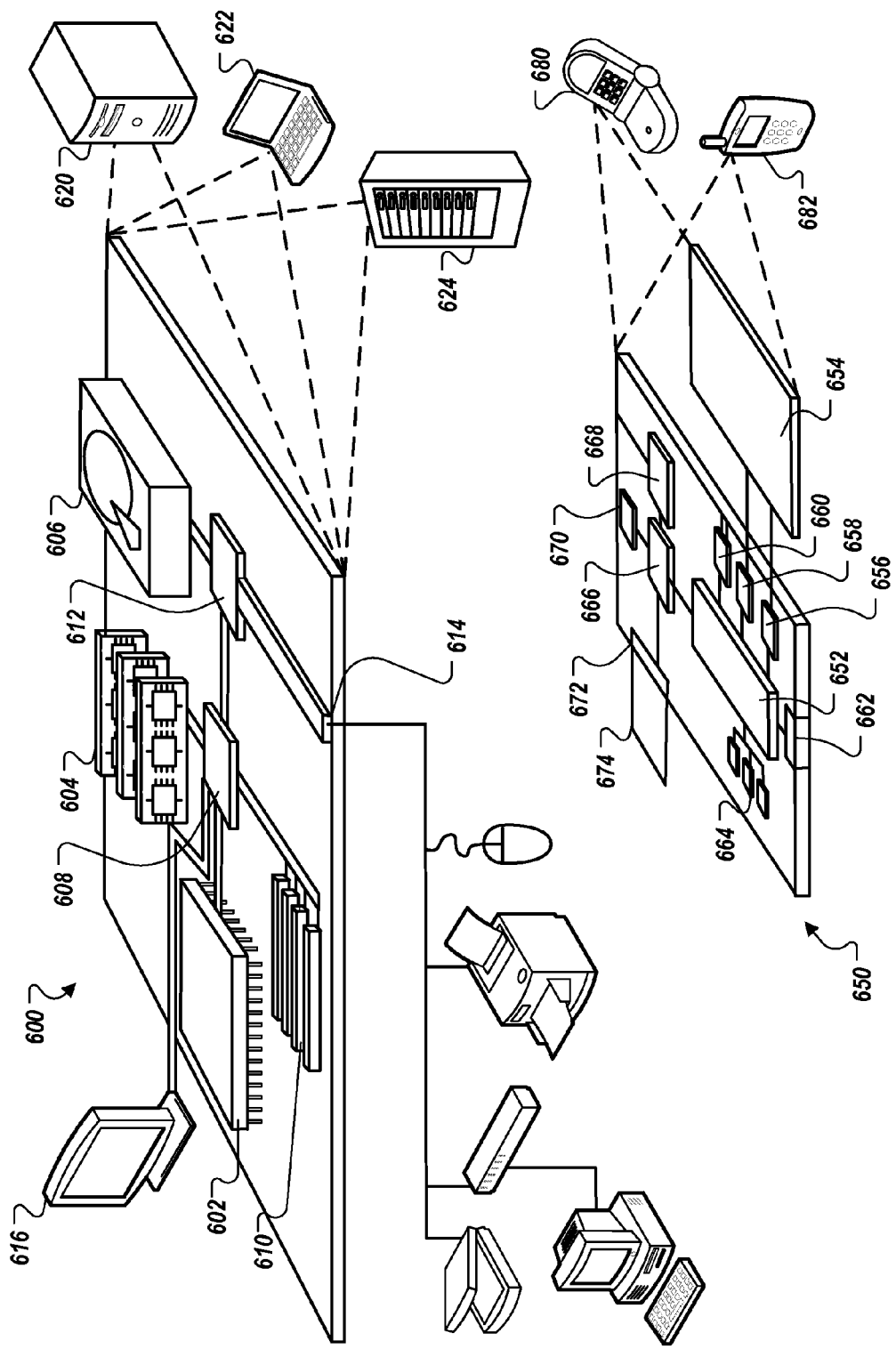
FIG. 6 shows an example of a computing device and a mobile computing device.

The client device 102 can be implemented using a computing device, such as the computing device 600 or the mobile device 650 described with respect to FIG. 6. The client device 102 can communicate with the hosted storage services 106 and 110 via a network 116, such as the Internet 116. The client device 102 can communicate across the network using communication protocols such as, for example, one or more of Transmission Control Protocol/Internet Protocol (TCP/IP), Hypertext Transfer Protocol (HTTP), Secure Shell Remote Protocol (SSH), or Application Program Interfaces (API). While only a single client device 102 is shown, there can be multiple client devices communicating across the network 116 with the hosted storage services 106 and 110, or other services or devices.

The client device 102 implements a client application 104 by executing instructions on one or more processing devices. In some implementations, the client application 104 may be implemented by more than one client device. In some implementations, the client application 104 may be implemented as a web application running in a web browser. The client application 104 can include functionality to store, retrieve, or otherwise access data on the client device 102, as well as to store, retrieve, or otherwise access data in an off-site, hosted, or cloud based data storage system, such as the first hosted storage service 106 and/or the second hosted storage service 110.

The first and second hosted storage services 106 and 110 can be implemented such that client applications, such as client application 104, can store, retrieve, or otherwise manipulate data objects in the hosted storage services 106 or 110. The hosted storage services 106 and 110 may be implemented by one or more server devices, which can be implemented using a computing device, such as the computing device 600 or mobile device 650 described with respect to FIG. 6. For example, the hosted storage services 106 and 110 can be implemented by multiple server devices operating in the same, or different, data centers. The hosted storage service 106 and the hosted storage service 110 may be separate services provided by different entities, or the same entity.

Each of the hosted storage services 106 and 110 can be accessed through an access protocol. For instance, the hosted storage service 106 or the hosted storage service 110 can be implemented as a Web Service with a corresponding set of Web Service Application Programming Interfaces (APIs). The Web Service APIs may be implemented, for example, as a Representational State Transfer (REST)-based HTTP interface or a Simple Object Access Protocol (SOAP)-based interface. The access protocol (e.g., API) for accessing the hosted storage service 106 may be different than the access protocol for accessing hosted storage service 110. This may be the case both when the services are implemented by different entities and when the services are implemented by the same entity. In some implementations, the access protocol may be the same for both of storage services 106 and 110.

In general, objects stored in the hosted storage service 106 or the hosted storage service 110 may be referenced by object identifiers. The hosted storage service 106 and the hosted storage service 110 may define namespaces to which a valid object identifier must conform. For example, the namespace may require that object identifiers be a sequence of Unicode characters whose UTF-8 encoding is at most 1024 bytes long. As another example, the namespace may require that object identifiers be globally unique identifiers (GUIDs), which may be 128-bit integers. As with the access protocols, the namespace for objects implemented by the hosted storage service 106 may be different than the namespace for objects implemented by the hosted storage service 110. This may be the case, for example, when these services are implemented by different entities, but also may be the case when the services are implemented by the same entity.

In some implementations, the hosted storage services 106 and 110 can provide access to stored data by applications running on computing devices geographically separate from each other, provide offsite data backup and restore functionality, provide data storage to a computing device with limited storage capabilities, and/or provide storage functionality not implemented on a computing device. Although two hosted storage services are shown, there can be more or fewer hosted storage services. For instance, in some implementations there may be only a single hosted storage service.

Hosted storage services may include a single type of datastore, or multiple types of datastores. For example, hosted storage service 106 includes a single type of datastore that is referred to as datastore 1 108. In such hosted storage services, data that is stored by the hosted storage services can be received, managed, and stored in the same way. For example, all data in datastore 1 108 may be stored as a Binary Large Objects (BLOBs).

On the other hand, hosted storage service 110 includes two types of datastores that are referred to as datastore 1 112 and datastore 2 114. In such hosted storage services, the datastores can have different requirements, limits, available functions, and performance profiles, for example. For instance, the datastore 1 112 can provide fast access to small data objects, and can automatically build multiple search indexes to support different access methods (e.g., datastore 1 112 may store data in a database format). By comparison, the datastore 2 114 can accept much larger data objects, store those objects more efficiently on disk (e.g. by including less fragmentation of objects for faster disk reading), but can not ensure speedy searching (e.g., datastore 2 114 stores data as BLOBs). In this example, a destination datastore for data sent from the client application 104 can be selected based on the type, size, and expected use of the data.

A hosted storage service that has multiple types of datastores may provide a single access protocol for accessing the service, and the service may determine which datastore is used. For instance, the hosted storage service 110 may provide a single access protocol to store, retrieve, or otherwise manipulate a data object, with the hosted storage service 110 selecting which of datastore 1 112 or datastore 2 114 is to be used to store a data object (or components of a data object). Alternatively, such a hosted storage service may have different access protocols for the different types of datastores. For example, there may be one access protocol for datastore 1 112 and a different access protocol for datastore 2 114.

Figure 2:
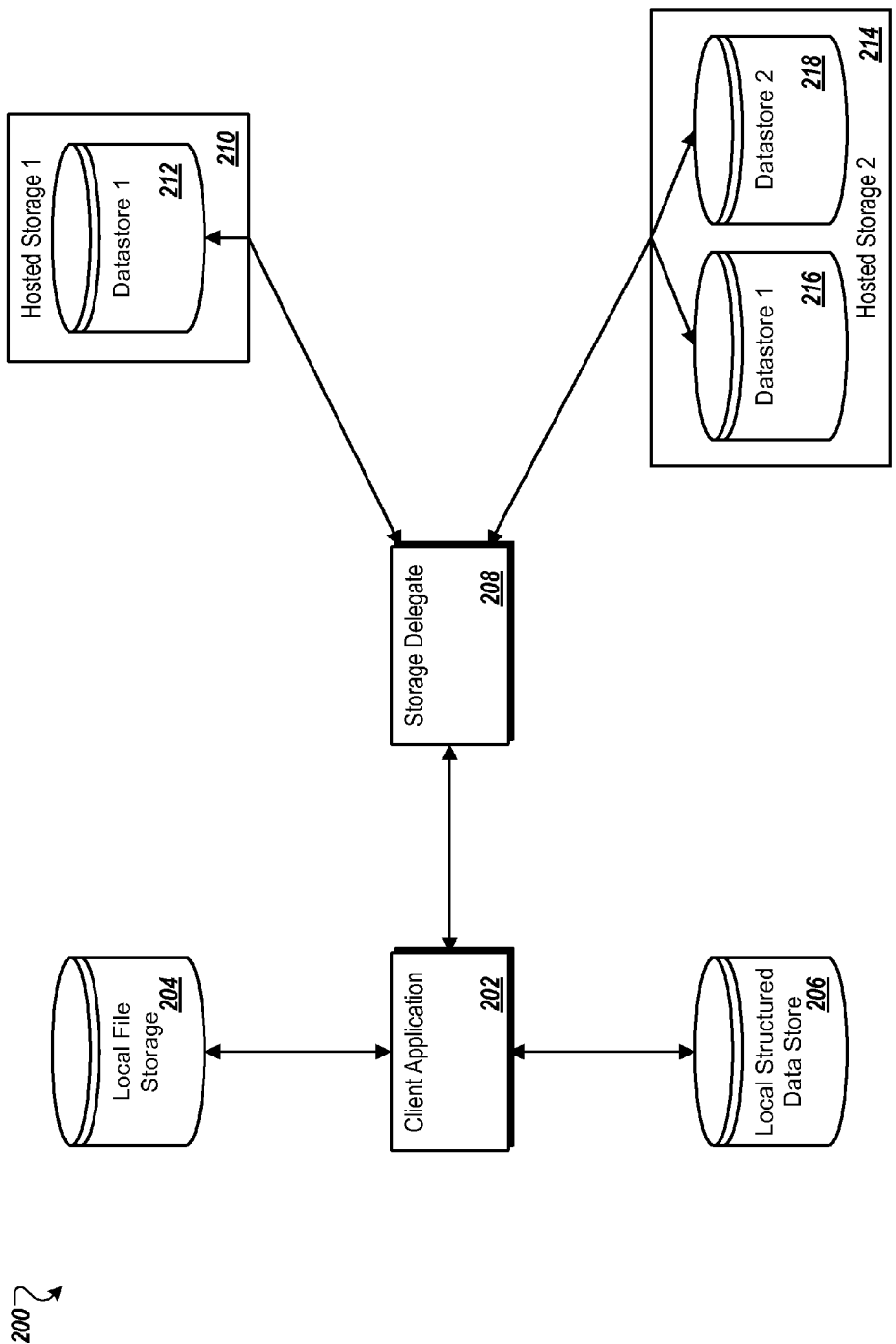
FIG. 2 is a block diagram showing an example of a system for storing and accessing data.

FIG. 2 is a block diagram showing an example of a system 200 for storing and accessing data. The system 200 includes a client application 202, a storage delegate 208, a first hosted storage 210, and a second hosted storage 214. In some implementations, the client application 202 is the same as client application 104, the hosted storage service 210 is the same as hosted storage service 106, and the hosted storage service 214 is the same as hosted storage service 110.

Generally, the storage delegate 208 handles the storing and accessing of data objects in hosted storage for the client application 202. The storage delegate can provide an abstraction layer so that a developer of the client application 202 does not have to worry about the specifics of accessing and storing data objects in the hosted storage services 210 and 214. Rather, the storage delegate 208 may implement an API that allows a developer to generally reference an object, while the delegate 208 determines the hosted storage service in which the object is, or should be, stored and the appropriate actions needed to store, retrieve, or otherwise manipulate that object in the hosted storage service.

The client application 202 can store data in local storage and/or hosted storage. The client application 202 can store some or all of the client application's 202 data locally in a local file storage 204 and a local structured datastore 206. In some implementations, the local file storage 204 can be a native file system directly accessible by the client application 202, and the local structured datastore 206 can be a datastore such as a relational database or software module that offers functionally not provided by the local file storage 204. Depending on the type of data, the client application 202 can be configured to store data in these two repositories according to the characteristics of the data and the way that the data is to be used and/or accessed. For example, the client application may store data that is required to be accessed with minimal latency in the local file storage 204 or local structured store 206.

The client application 202 can also store data in hosted storage, such as hosted storage service 210 and/or hosted storage service 214. To do so, the client application 202 can, for example, use an API to send storage related requests to the storage delegate 208. To implement the requests, the storage delegate 208 can dynamically reference hosted storage services and associated datastores in the hosted storage services. For example, the storage delegate 208 may be able to receive data or commands that contain data objects from the client application 202 and route the data to a hosted storage service and/or datastore. In some implementations, the storage delegate 208 can, for instance, receive storage parameters from the client application 202, for example, for use in determining a hosted storage service and/or datastore in which to store data.

From time to time, additional hosted storage services and/or datastores can become available. In these cases, the storage delegate 208 can reference the new hosted storage services and/or datastores. In this way, the client application 202 can have access to the data storage functionality of the new systems.

Similarly, hosted storage services and/or datastores can become unavailable from time to time (e.g., as a result of experiencing downtime or termination of a business contract providing access). In these cases, the storage delegate 208 can remove those hosted storage services and/or datastores from consideration for storing data.

In some implementations, the storage delegate 208 can execute on the same computing device that executes the client application 202 as, for example, a subsystem of the client application 202, a dynamic linked library, or an operating system daemon or service. If the delegate 208 is implemented as a dynamic linked library, for example, the library may be updated from time to time to make new hosted storage services available, or to remove hosted storage services that are no longer available.

In some implementations, the storage delegate 208 can execute on a different computing device than that which executes the client application 202. For example, the delegate 208 may be implemented as part of a hosted storage service (e.g., in a front end) or as a middleware layer in an enterprise software system. As another example, the storage delegate 208 may be implemented as a Web Service, either as part of a hosted storage service or as a stand-alone service.

As described above, the hosted storage services 214 and 216 can have different access protocols. Similarly, even when a single hosted storage service is accessed, access to different types of datastores may use different access protocols (e.g., there may be a different access protocols to access datastore 1 216 and datastore 2 218).

In some implementations, the storage delegate 208 can hide this complexity from a developer of the client application by providing an abstraction layer. For instance, the storage delegate 208 may implement an API that allows a developer to generally reference an object, while the delegate 208 determines the hosted storage service in which the object is, or should be, stored and the appropriate actions needed to store, retrieve, or otherwise manipulate that object in the hosted storage service. The following are examples of API functions that can be provided by the storage delegate 208 to the client application 202:

1. Put (BucketName, ObjectName, Object)
2. Byte[ ] Get (BucketName, ObjectName)
3. AssociateBucket (BucketName, Storage)
4. Storage SelectService (StorageParameters)

In the Put function, the client application 202 can specify a bucket name, the name of a data object, and a data object to be stored. The BucketName can represent a logical bucket or data container that can hold one or more data objects. The ObjectName can specify the name of the data object that can be stored in the bucket. In some implementations, each data object within a bucket can be given a unique ObjectName. As an example, the BucketName and ObjectName can be specified as being string data starting with a-z, A-Z or 0-9, followed by an arbitrary number of additional characters including a-z, A-Z or 0-9. The Object can be the data object to be stored in a hosted storage service, and may be in a binary format. In some implementations, the Object is cast in a particular format (e.g., a serialized string) before being passed to the Put function.

In the Get function, the client application 202 can request a stored data object by specifying a BucketName and ObjectName. In some examples, the Get function can return a byte array (e.g., Byte[ ]), an untyped object, or a protyped object, and reflection techniques can be used to determine the class or type of object returned.

In the AssociateBucket function, the client application 202 can associate a bucket with a particular hosted storage service. The Storage parameter can represent the name or reference of a hosted storage service and/or datastore, and may be specified as a string. The name of the hosted storage service can be selected, for example, using the SelectService function or may be directly designated by the developer if the developer knows which service he or she wants to be used. The functionality provided by the Put, Get, and AssociateBucket functions can provide a system which organizes all data stored in hosted storage according to a single namespace, defined by the combination of Bucket-Name and ObjectName, accessible by the client application 202.

In some implementations, buckets may contain other buckets. In this case, ObjectName may be simply Object-Name or it may be (BucketName, ObjectName), such that the the namespace may be defined by the combination of BucketName, (BucketName, ObjectName), with the BucketName in parenthesis being null when recursive buckets are not used. Recursive buckets may be used, for example, when implementing the multi-tier delegates in system 500 described below with respect to FIG. 5.

In the SelectService function, the client 202 can request the name or reference of a hosted storage service and/or datastore that meets the specifications of the StorageParameters. The StorageParameters can be a collection of parameters, such as, for example, an object's size, a minimum level of security, if the service should support queries, a minimum performance metric, a maximum cost metric, and/or a minimum privacy protection.

Thus, for example, a developer of the client application 202 can use the SelectService function to select a particular hosted storage service, and then associate that hosted storage service with a particular bucket name. When that bucket name is passed with a Put or Get function, the delegate 208 uses the particular hosted storage service for storing and retrieving the data object.

The following describes an example in which the client application 202 is a photo library application running on a personal computer. The client application 202 can import a collection of photos from a digital camera and store the photo files in the local file storage 204. The client application 202 can also collect and create metadata about the photos (e.g., exif data, date and time of import or tags identifying people in the photos). The metadata can be stored in the local structured datastore 206, which may be, for example, a database controlled by the client application 202.

The user can select a collection of photos to be stored in a hosted storage service. The client application 202 can create a list of specifications for hosting the image files and a list of specifications for hosting the metadata files. In this example, some or all of the features of the local file storage 204 and the local structured datastore 206 can be used to create the lists. The client application 202 can request references to hosted storage destinations that meet the storage requirements from the storage delegate 208.

The storage delegate 208 can identify that the hosted storage 1 212 contains a datastore 1 212 that offers query services, supports undo, and has a file size limit large enough to hold the metadata. The storage delegate 208 can identify that the hosted storage 2 214 contains a datastore 2 218 that freely hosts large files. The storage delegate 208 can return references to these two datastores 212 and 218 to the client 202. The client can create a bucket associated with the datastore 1 212 for photo metadata and a bucket associated with the datastore 2 218 for photo files.

The client application can send commands to store data to the storage delegate 208. These commands can specify a bucket and a data object to store in the bucket. The storage delegate 208 can generate commands to send to the datastores 212 and 218 to store the data objects. The addresses or references to the data in the datastores 212 and 218 can be recorded in the storage delegate 208 and associated with the buckets specified by the client application 202.

Figure 3:
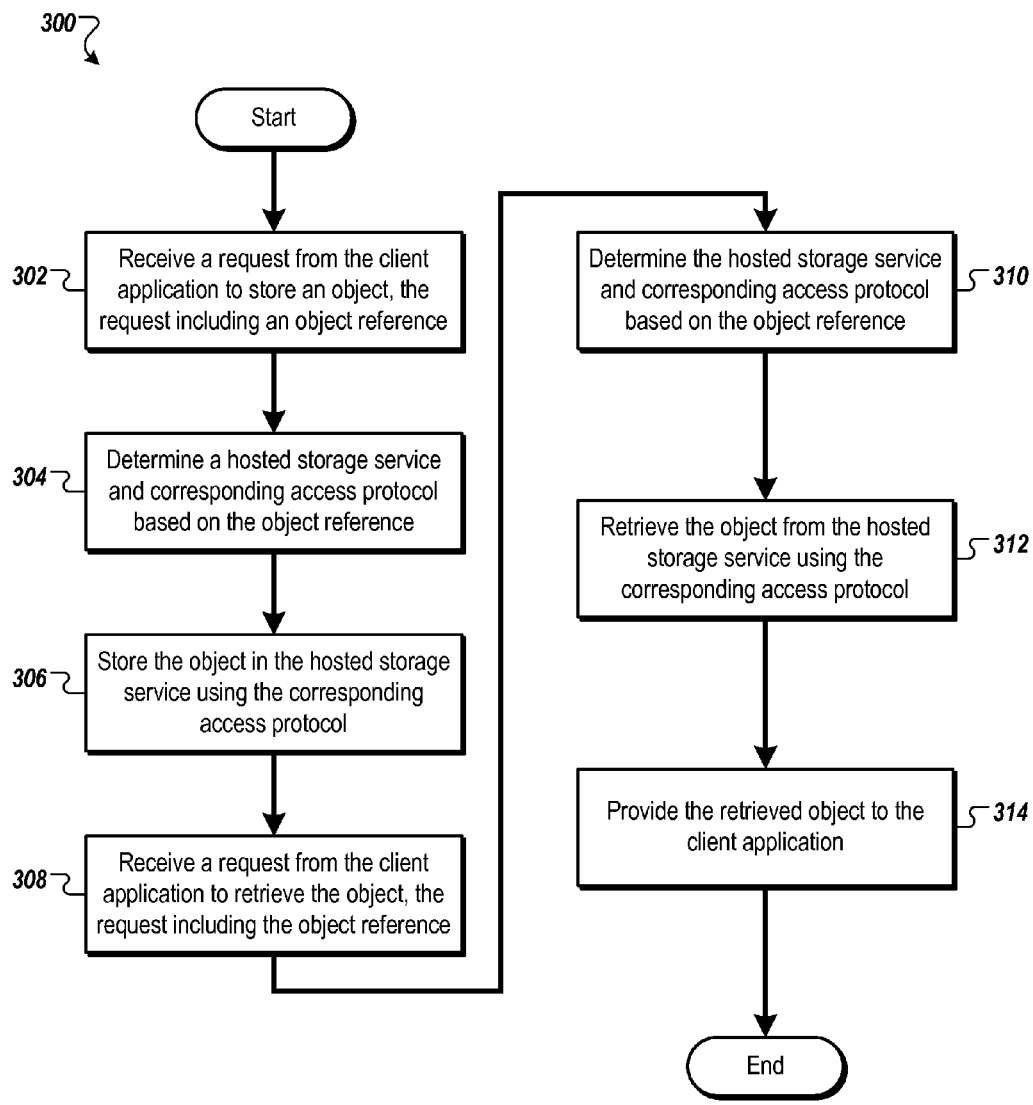
FIG. 3 is a flow chart showing an example of a process for storing and retrieving data in a hosted storage service

FIG. 3 is a flow chart showing an example of a process 300 for storing and retrieving data in a hosted storage service. The process 300 can be performed by, for example, the storage delegate 208, and for clarity of presentation, the description that follow uses the system 200 as the basis for describing the process. However, another system, or combination of systems, may be used to perform the processes 300.

A request is received by the storage delegate 208 from the client application 202 to store an object (302). The request includes an object reference. For example, the client application 202 can call the Put function of the storage delegate 208, specifying a BucketName, ObjectName, and Object. The combination of the BucketName and ObjectName can act as an object reference, and may uniquely identify the object. In implementations that employ recursive buckets as described above, the object reference may include BucketName, (ObjectName, BucketName), and Object.

The storage delegate 208 determines a hosted storage service, from among multiple hosted storage services, and a corresponding access protocol based on the object reference (304). For example, the BucketName can be mapped to a hosted storage service by the storage delegate 208. The storage delegate 208 can determine the access protocol from a list of access protocols available for accessing the particular hosted storage service mapped to the BucketName. In some implementations, if no hosted storage service is associated with the BucketName, the storage delegate 208 can determine, from a list of known storage services and their associated access protocols, a hosted storage service, and corresponding access protocol, capable of storing the object. The storage delegate 208 then can associate the selected hosted storage service with the BucketName.

The storage delegate 208 stores the object in the determined hosted storage service using the corresponding access protocol (306). For example, a function call to store a data object can be identified in the access protocol, and that function can be called using the object as a parameter. In some implementations, the protocol specifies an address, an identification variable, or another reference to the object stored in the hosted storage service. This storage value, or object identifier, can be associated with the object reference by the storage delegate 208.

The storage delegate 208 receives a request from the client application 202 to retrieve the object (308). The request includes the object reference. For example, the client application 202 can call the Get function with the same BucketName and ObjectName as used in action 302.

The storage delegate 208 determines the hosted storage service and corresponding access protocol based on the object reference (310). For example, similarly to action 304, the BucketName can be mapped to a hosted storage service by the storage delegate 208. Additionally, the storage value associated with the object reference can be identified by the storage delegate 208.

The storage delegate 208 retrieves the object from the hosted storage service using the corresponding access protocol (312). For example, a function call to retrieve a stored data object can be identified in the access protocol, and that function can be called to retrieve a copy of the object.

The storage delegate provides the retrieved object to the client application 202 (314). For example, the copy of the object can be passed from the storage delegate 208 to the client application 202 as the return value of the Get function.

FIG. 4A-4D are flow charts showing examples of processes that may be used to implement the example function calls described above. The processes in FIG. 4A-4D can be performed by, for example, the storage delegate 208, and for clarity of presentation, the description that follows uses the systems 200 as the basis for describing the processes. However, another system, or combination of systems, may be used to perform the processes 300. Additionally, some features that may be implemented in the example function calls are not illustrated by the processes. For example, unshown error checking, caching, platform and language specific considerations, and corner case logic can be included in the functions.

Figure 4A:
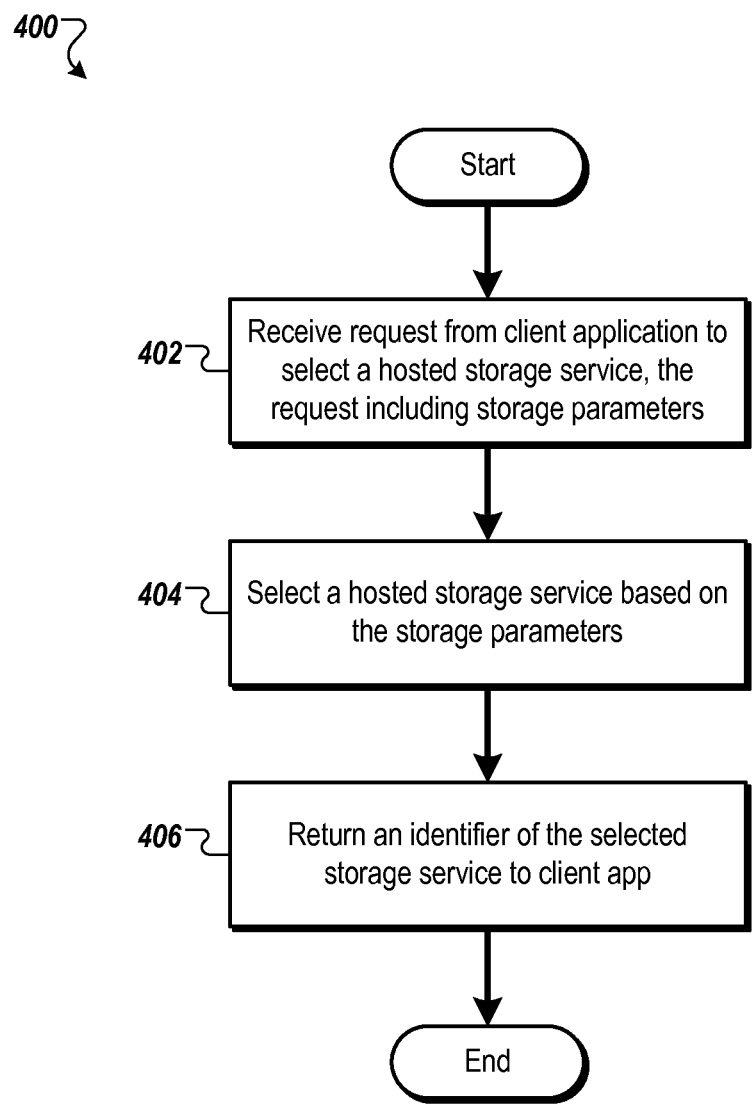
FIG. 4A-4D are flow charts showing examples of processes for implementing function calls.

FIG. 4A shows an example of a process 400 for selecting a service. The process 400 can be associated with, for example, the SelectService function.

The storage delegate 208 receives a request from the client application 202 to select a hosted storage service (402). This request includes storage parameters. For example, the client application 202 can identify the storage parameters associated with a data object to be stored in a hosted storage system. These parameters can include, but are not limited to, the object's size, a minimum level of security, if the service should support queries, a minimum performance metric (for example, a minimum latency), a maximum cost metric, or a minimum privacy protection. These parameters can be formatted into, for example, a compound data type variable (for example, an array) and received by the storage delegate 208.

For example, a class of objects such as e-mails may be relatively small, but may need frequent and quick access. In this case, a request to select a hosted storage service may designate a relatively small minimum object size and a minimum latency, which are used to select the appropriate hosted storage service. As another example, another class of objects (for example, medical records) may be relatively large, need to be queried, and require stringent security and privacy protections. In this case, the request to select a hosted storage service may designate a relatively large minimum object size supported, that queries should be supported, and high levels of minimum security and privacy protections, which would be used to select an appropriate hosted storage service.

In response to receiving the request, the storage delegate 208 selects a hosted storage service, from among multiple hosted storage services, based on the storage parameters. For example, multiple hosted storage services with associated service profiles may be known (for example, hosted storage services 210 and 214). One or more hosted storage services can contain multiple datastores, which each can have associated service profiles. One or more hosted storage services can be identified that meet the storage parameters, including a hosted storage service that includes one or more datastores that do not meet the storage parameters. If multiple hosted storage services are selected, one of these hosted storage services can be selected, for example based on surpassing minimum criteria, least network traffic, or least cost. If a hosted storage service with multiple datastores is selected, one of the datastores that meets the storage parameters can be selected.

Once the hosted storage service is selected, the storage delegate 208 returns an identifier of the selected storage service to the client application 202 (406). For example, a name or reference can be associated with the selected hosted storage service and/or selected datastore by the storage delegate 208. This name or reference can be returned to the client application 202, and any future communication from the client application 202 that uses this identifier can be assumed to be in reference to the selected hosted storage service and/or selected datastore.

Figure 4B:
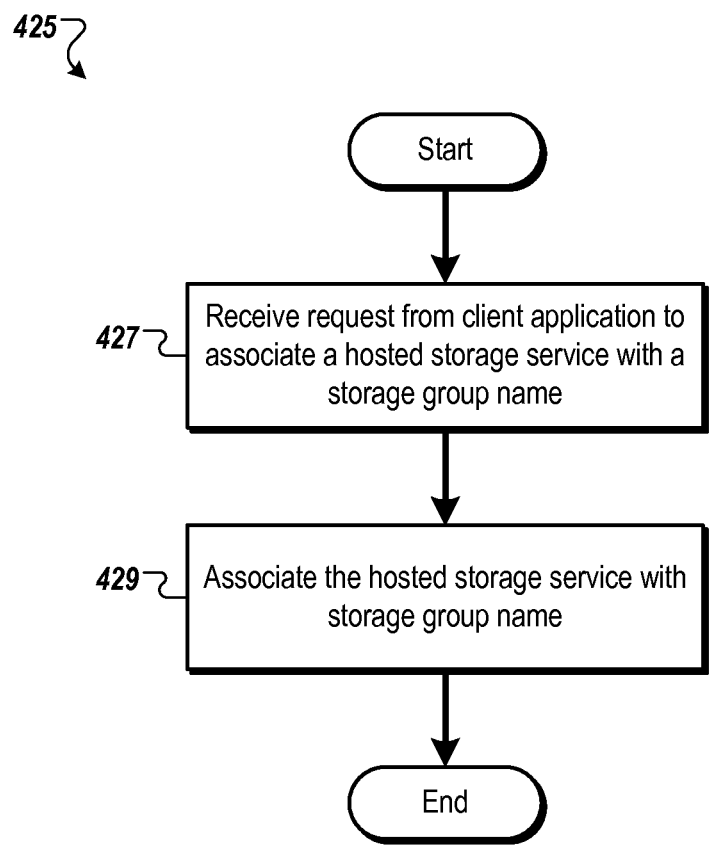

FIG. 4B shows an example of a process 425 for associating a hosted storage service with a storage group name (for example, BucketName described above). The process 425 can be associated with, for example, the AssociateBucket function.

The storage delegate 208 receives a request from the client application 202 to associate a hosted storage service with a storage group name (427). For example, the storage group name received by a storage delegate can be a storage grouping (for example, a bucket) created by the client application 202. The storage group can hold multiple data objects that can be related or organized together by the client application 202.

In response to receiving the request, the storage delegate 208 associates the hosted storage service with the storage group name (429). For example, the hosted storage service and the storage group name can be entered into a database, hash-table, bipartite graph and/or a data structure associated with the hosted storage service.

Figure 4C:
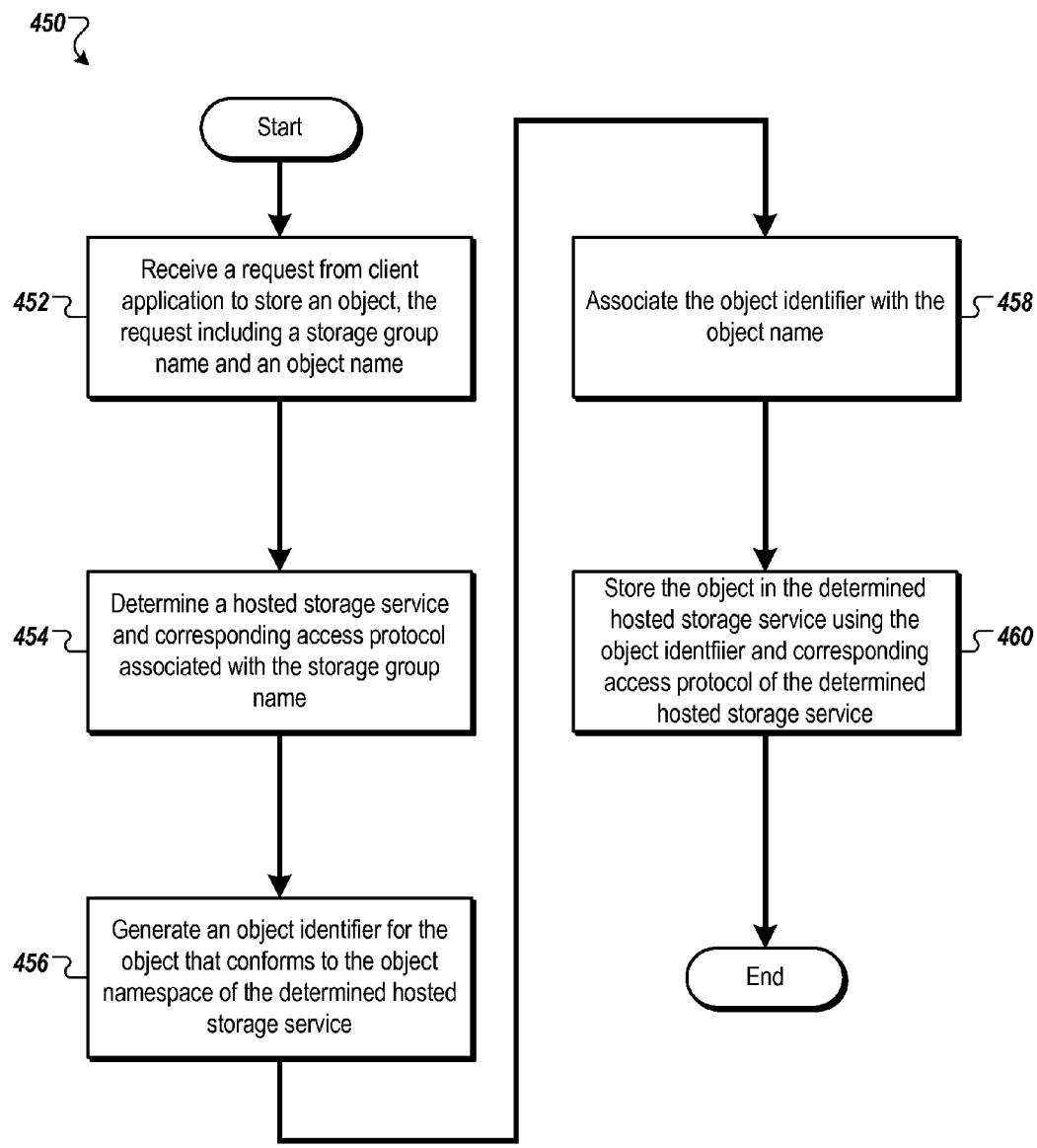

FIG. 4C shows an example of a process 450 for storing an object. The process 450 can be associated with, for example, the Put function.

The storage delegate 208 receives a request from the client application 202 to store an object (452). The request includes a storage group name and an object name, where the object named is to be stored in the storage group.

In response to receiving the request, the storage delegate 208 determines a hosted storage service and corresponding access protocol associated with the storage group name (454). For example, the storage group can be used to determine a hosted storage service and/or datastore that was associated with the storage group name using the process 425. The hosted storage service and/or datastore can be used to determine the access protocol for accessing the hosted storage service.

The storage delegate 208 generates an object identifier for the object that conforms to the object namespace of the determined hosted storage service (456). As described above, some hosted storage services may define a namespace that places requirements on the object identifiers used for the hosted storage service. The storage delegate 208 can generate an object identifier that meets these requirements. In some implementations, the hosted storage service may provide a function to request a new object identifier and, in such a situation, the storage delegate 208 may generate an object identifier by requesting one from the hosted storage service. In some implementations, the client application 202 can provide to the storage delegate 208 an object identifier that is compatible with the selected service. In such implementations, the generation of the object identifier involves receiving the object identifier from the client application 202, for example, as part of the function call (e.g., the object identifier may be passed through the function call to the delegate 208). The object name supplied by the client application 202 can be associated with the object identifier, for example, by entering both in a row of a database, entry into a hash table, or by use of another data structure.

The storage delegate 208 stores the object in the determined hosted storage service using the object identifier and corresponding access protocol (460). For example, the particular access protocol may provide a storage function call in which the object and object identifier are passed to the hosted storage service for storage. In some implementations, the functionality provided by the hosted storage service can cause the step 458 and 460 to be processed as a single step. For example, if the hosted storage service does not return an object identifier until after or as part of the step of storing a data object, the object identifier and the object name may be associated after storage.

Figure 4D:
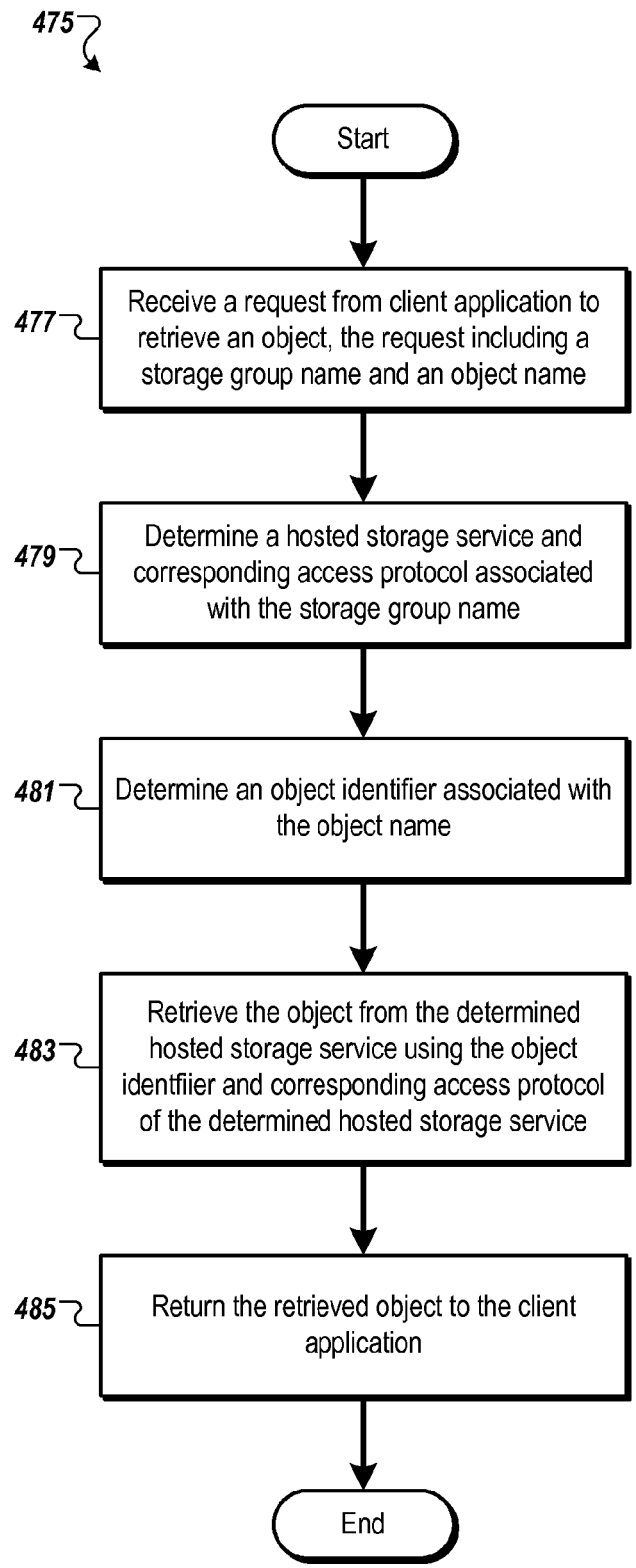

FIG. 4D shows an example of a process 475 for retrieving an object. The process 475 can be associated with, for example, the Get function.

The storage delegate 208 receives a request from the client application 202 to retrieve an object (477). The request includes a storage group name and an object name. For example, the object can be an object that was previously stored on a hosted storage service, such as by the Put function.

In response to receiving the request, the storage delegate 208 determines a hosted storage service and corresponding access protocol associated with the storage group name (479). For example, the storage group name can be used to determine a hosted storage service and/or datastore that was associated with the storage group name using the process 425. The hosted storage service and/or datastore can be used to determine the access protocol for accessing the hosted storage service.

The storage delegate 208 determines an object identifier associated with the object name (481). The object identifier, for example, may have been generated previously by the storage delegate 208 and used to store the object in the hosted storage service (for example, using process 450). The object identifier, therefore, may generally conform to the namespace of the hosted storage service and correspond to the object identifier for the object in the hosted storage service.

The storage delegate 208 retrieves the object from the determined hosted storage service using the object identifier and the corresponding access protocol of the determined hosted storage service (483). For example, the particular access protocol may provide a retrieval function call in which the object identifier is passed to the hosted storage service and, in response, the hosted storage service returns the object to the storage delegate 208.

The storage delegate 208 returns the retrieved object to the client application (485). For example, the object can be returned to the client application 202 as a function return.

Figure 5:
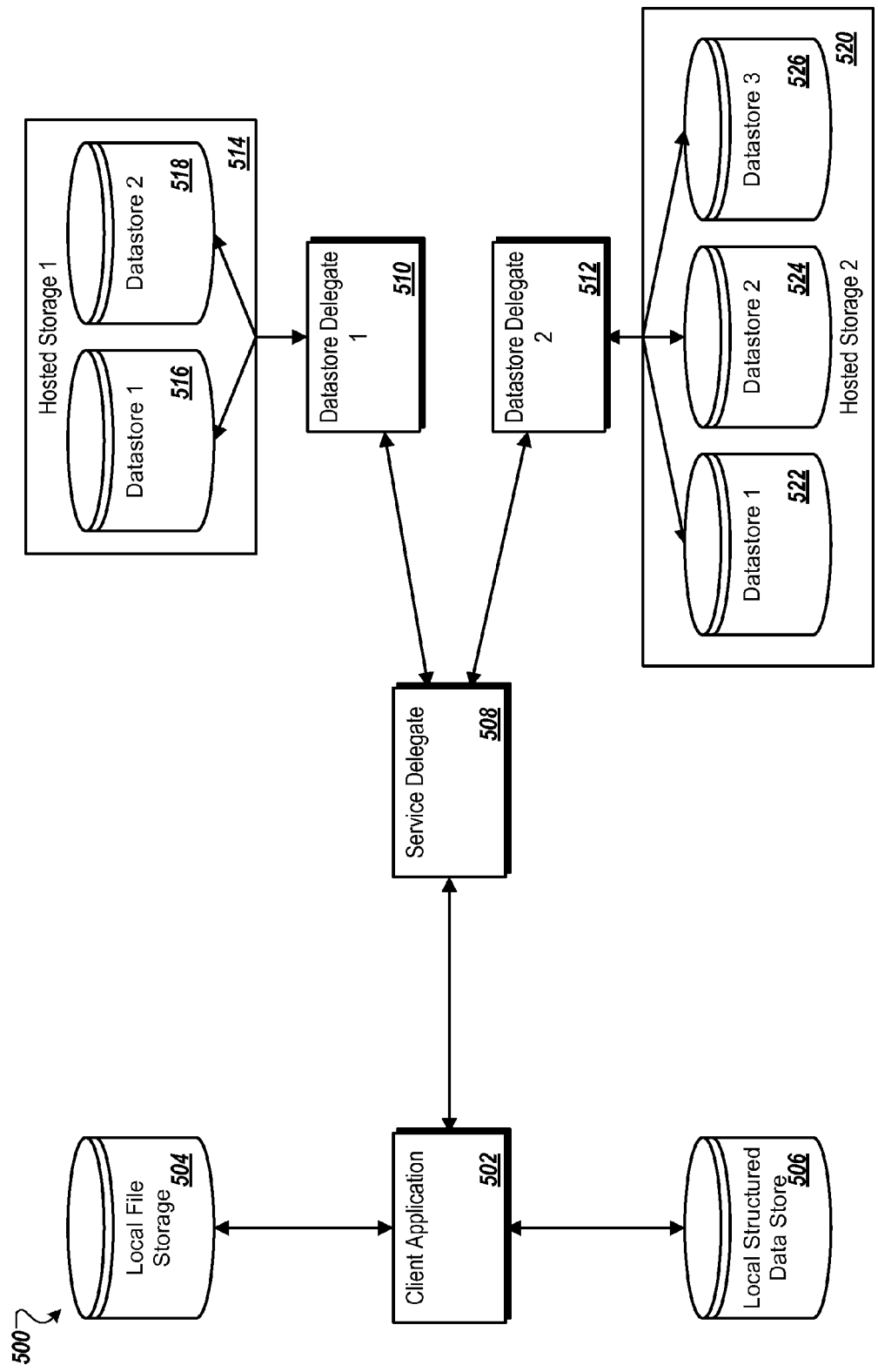
FIG. 5 is a block diagram showing another example of a system for storing and accessing data.

FIG. 5 is a block diagram showing another example of a system 500 for storing and accessing data. System 500 uses a multi-tier delegate for handling the storage of data objects in hosted storage services. In general, a service delegate 508 can determine a hosted storage service, and a datastore delegate (for example, datastore delegate 1 510 or datastore delegate 2 512) can determine a particular datastore within the hosted storage service.

The client application 502 can store data in a local file storage 504 and a local structured datastore 506. The client application 502 can also store data in a datastore in a hosted storage service using the service delegate 508 and one or both of the datastore delegates 510 and 512. For example, the service delegate 508 and datastore delegates 510 and 512 may support API functions similar to those described with respect to storage delegate 202, except that the service delegate 508 is responsible for selecting a particular hosted storage service and communicating with that service's datastore delegate 510 or 512, while the datastore delegate 510 or 512 is responsible for selecting and communicating with a particular datastore in the selected hosted storage service.

For example, the service delegate 508 may implement the SelectService, AssociateBucket, Put, and Get functions described above, except that the service delegate 508 only selects a particular hosted storage service (for example, based on some or all of the storage parameters) and does not select a particular datastore. In this case, the datastore delegates 510 and 512 may implement a service API which is accessible by the service delegate 508. The datastore delegates 510 or 512 then may, for instance, implement functions such as (1) SelectDatastore (StorageParameters), which selects a Datastore based on some or all of the storage parameters, (2) AssociateBucket (BucketName, Datastore), which associates BucketName with a particular Datastore, (3) Put (BucketName, ObjectName, Object), which stores the object in the datastore associated with the BucketName and associates an object identifier of the object in the datastore with ObjectName, and (4) a Get (BucketName, ObjectName), which retrieves the object from the datastore associated with the BucketName using the object identifier associated with ObjectName. The BucketName and ObjectName passed to the datastore delegate 510 or 512 from the service delegate 508 may be the same, or different, than the BucketName and ObjectName passed to the service delegate 508 by the client application 502.

For example, to store data in a datastore in a hosted storage system, the client application 502 can use the SelectService function to send a request to the service delegate 508 to select a storage, with the request including the storage parameters related to the capabilities of the storage and characteristics of the data object to be stored. The service delegate 508 can receive the request and determine a particular hosted storage service 514 or 520 based on some or all of the storage parameters.

The service delegate 508 can then use the SelectDatastore function to send to the datastore delegate 510 or 512 of the selected service a request to select a particular datastore, with the request including some or all of the storage parameters. The selected storage delegate 510 or 512 can select a datastore 516-518 or 522-526 based on some or all of the storage parameters received. A reference to the selected datastore 516-518 or 522-526 can be returned to the service delegate 508, which returns a reference to both the selected service and datastore to the client application.

The client application 502 can then call the service delegate's 508 AssociateBucket function, passing the reference to the selected service and datastore to the function along with a bucket name. In some implementations the service delegate 508 then associates the selected service with the bucket name, and calls the selected datastore delegate's AssociateBucket function, passing the reference to the selected datastore and the bucket name to the function.

As a result, the selected datastore delegate 510 or 512 associates the bucket name with the selected datastore. In some implementations, the service delegate 508 associates both the selected service and datastore with the bucket name.

The client application 502 can store or retrieve an object by then calling the service delegate's Put or Get functions, respectively. This results in the service delegate 508 calling the Put or Get functions, respectively, of the selected datastore delegate 510 or 512.

FIG. 6 shows an example of a computing device 600 and a mobile computing device 650 that can be used to implement the techniques described here. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A system comprising:
a delegate configured to:
receive, from a client, a request for the delegate to select a datastore for the client, from among a plurality of datastores included as part of a hosted storage system, based on one or more storage parameters included in the request, wherein the one or more storage parameters specify storage performance capabilities that a datastore is required to meet to be selected to store a data object;
select, based the on one or more parameters, a datastore from among a plurality of datastores as a selected datastore, the selection of the selected datastore based on the selected datastore having performance capabilities that meet the storage performance capabilities specified in the storage parameters;
send, to the client, an indication of the selected datastore;
the client configured to:
send, to the delegate, the request to select the datastore for the client, from among the plurality of datastores included as part of the hosted storage system, based on one or more storage parameters;
receive, from the delegate, the indication of the selected datastore; and
send, to the hosted storage system, a request to store a data object in the selected datastore;
the hosted storage system, wherein the hosted storage system includes the plurality of datastores and is configured to:
receive, from the client, the request to store the data object in the selected datastore; and
store, in response to receiving the request to store the data object in the selected datastore, the data object in the selected datastore, wherein the plurality of datastores store data in different storage formats.

2. The system of claim 1, wherein:
the client comprises a first client-datastore and a second client-datastore;
the client is further configured to:
store data objects of a first-type in the first client-datastore; and
store data objects of a second-type in the second client-datastore; and
the hosted storage system is further configured to:
store data objects of the first-type in a first datastore of the plurality of datastores; and
store data objects of the second-type in a second datastore of the plurality of datastores.

3. The system of claim 2, wherein:
the first client-datastore and the first datastore both support a first storage format; and
neither the second client-datastore nor the second datastore support the first storage format.

4. The system of claim 3, wherein:
the second client-datastore and the second datastore both support a second storage format; and
neither the first client-datastore nor the first datastore support the second storage format.

5. The system of claim 2, wherein:
the first client-datastore and the first datastore both store copies of a first plurality of data objects; and
the second client-datastore and the second datastore both store copies of a second plurality of data objects.

6. The system of claim 1, wherein the one or more storage parameters comprise one or more of a data size, a level of security, whether queries should be supported, a latency metric, a cost metric, or a privacy metric.

7. The system of claim 1, wherein the client includes the delegate.

8. The system of claim 1, wherein the hosted storage system includes the delegate.

9. The system of claim 1, wherein the client does not include the delegate and wherein the hosted storage system does not include the delegate.

10. The system of claim 1 wherein the hosted storage system is configured to maintain a namespace of names, wherein:
each name uniquely identifies a data object stored by the hosted storage system;
each name comprises a bucket name and an identifier;
the name of at least one data object stored in a first datastore of the plurality of datastores includes a particular bucket name; and
the name of at least one data object stored in a second datastore of the plurality of datastores also includes the particular bucket name.

11. A method comprising:
receiving, at a delegate and from a client, a request for the delegate to select a datastore for the client, from among a plurality of datastores included as part of a hosted storage system, based on one or more storage parameters included in the request, wherein the one or more storage parameters specify storage performance capabilities that a datastore is required to meet to be selected to store a data object;
selecting, based on the one or more storage parameters, a datastore from among a plurality of datastores as a selected datastore, the selection of the selected datastore based on the selected datastore having performance capabilities that meet the storage performance capabilities specified in the storage parameters;
sending, to the client, an indication of the selected datastore;
receiving, at a hosted storage system and from the client, the request to store the data object in the selected datastore, wherein the hosted storage system includes the plurality of datastores; and
store, in response to receiving the request to store the data object in the selected datastore, the data object in the selected datastore, wherein the plurality of datastores store data in different storage formats.

12. The method of claim 11, wherein:
the client comprises a first client-datastore and a second client-datastore;
the client is configured to:
store data objects of a first-type in the first client-datastore; and
store data objects of a second-type in the second client-datastore; and
the hosted storage system is further configured to:
store data objects of the first-type in a first datastore of the plurality of datastores; and
store data objects of the second-type in a second datastore of the plurality of datastores.

13. The method of claim 12, wherein:
the first client-datastore and the first datastore both support a first storage format; and
neither the second client-datastore nor the second datastore support the first storage format.

14. The method of claim 13, wherein:
the second client-datastore and the second datastore both support a second storage format; and
neither the first client-datastore nor the first datastore support the second storage format.

15. The method of claim 12, wherein:
the first client-datastore and the first datastore both store copies of a first plurality of data objects; and
the second client-datastore and the second datastore both store copies of a second plurality of data objects.

16. The method of claim 11, wherein the one or more storage parameters comprise one or more of a data size, a level of security, whether queries should be supported, a latency metric, a cost metric, or a privacy metric.

17. The method of claim 11, wherein the client includes the delegate.

18. The method of claim 11, wherein the hosted storage system includes the delegate.

19. The method of claim 11, wherein the client does not include the delegate and wherein the hosted storage system does not include the delegate.

20. The method of claim 11, wherein the hosted storage system is configured to maintain a namespace of names, wherein:
each name uniquely identifies a data object stored by the hosted storage system;
each name comprises a bucket name and an identifier;
the name of at least one data object stored in a first datastore of the plurality of datastores includes a particular bucket name; and
the name of at least one data object stored in a second datastore of the plurality of datastores also includes the particular bucket name.

* * * * *

UNITED STATES PATENT AND TRADEMARK OFFICE
CERTIFICATE OF CORRECTION

PATENT NO.           : 9,762,670 B1
APPLICATION NO.  : 14/543737
DATED                    : September 12, 2017
INVENTOR(S)         : Grove et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 307 days.

Signed and Sealed this
Twenty-fifth Day of September, 2018

Andrei Iancu
*Director of the United States Patent and Trademark Office*